(12) United States Patent
Swart

(10) Patent No.: US 9,446,824 B2
(45) Date of Patent: Sep. 20, 2016

(54) BOAT BUNK

(71) Applicant: Mathys Johannes Swart, Boksburg (ZA)

(72) Inventor: Mathys Johannes Swart, Boksburg (ZA)

(*) Notice: Subject to any disclaimer, the term of this patent is extended or adjusted under 35 U.S.C. 154(b) by 0 days.

(21) Appl. No.: 14/646,228

(22) PCT Filed: Aug. 6, 2013

(86) PCT No.: PCT/ZA2013/000062
§ 371 (c)(1),
(2) Date: May 20, 2015

(87) PCT Pub. No.: WO2014/082102
PCT Pub. Date: May 30, 2014

(65) Prior Publication Data
US 2015/0298779 A1    Oct. 22, 2015

(30) Foreign Application Priority Data

Nov. 20, 2012   (ZA) .................................. 2012/08706

(51) Int. Cl.
| | | |
|---|---|---|
| *B63C 3/02* | (2006.01) | |
| *B63C 3/00* | (2006.01) | |
| *B60P 3/10* | (2006.01) | |
| *B60R 9/08* | (2006.01) | |
| *B62D 33/02* | (2006.01) | |
| *F16F 1/376* | (2006.01) | |

(52) U.S. Cl.
CPC ............... *B63C 3/02* (2013.01); *B60P 3/1066* (2013.01); *B60R 9/08* (2013.01); *B62D 33/02* (2013.01); *B63C 3/00* (2013.01); *F16F 1/376* (2013.01)

(58) Field of Classification Search
CPC ............ B63C 3/02; B60R 9/08; B62D 33/02
USPC ............................. 280/414.1–414.3; 211/85.7
See application file for complete search history.

(56) References Cited

U.S. PATENT DOCUMENTS

| | | | | |
|---|---|---|---|---|
| 2,999,041 A * | 9/1961 | Lappala | .................. | B32B 27/00 428/101 |
| 3,310,453 A * | 3/1967 | Lappala | .................. | B32B 27/00 428/101 |
| 4,754,988 A * | 7/1988 | Hofgren | ................ | B60P 3/1033 114/344 |
| 4,775,567 A * | 10/1988 | Harkness | ................ | B32B 11/04 428/351 |
| 4,955,778 A * | 9/1990 | Godbersen | ............ | B60P 3/1066 280/414.1 |
| 5,002,299 A * | 3/1991 | Firehammer | ......... | B60P 3/1066 280/414.1 |
| 5,383,314 A * | 1/1995 | Rothberg | ................ | E02D 31/02 405/43 |
| 5,390,467 A * | 2/1995 | Shuert | ..................... | B29C 51/10 156/292 |
| 5,794,388 A * | 8/1998 | Jackman | ............... | E04B 1/7023 405/36 |
| 5,809,735 A * | 9/1998 | Leblanc | .................... | E04C 3/18 52/847 |
| 6,149,360 A * | 11/2000 | Billotte | ............. | B62D 33/0215 410/32 |
| 6,167,675 B1 * | 1/2001 | LeBlanc | ................... | E04B 5/12 403/232.1 |
| 6,651,997 B2 * | 11/2003 | Higginson | ............ | B60P 3/1066 280/414.1 |
| 6,830,410 B2 * | 12/2004 | Davidson | ................. | B63C 3/06 280/414.1 |
| 7,055,449 B2 * | 6/2006 | Brown | .................. | B60P 3/1066 114/219 |

(Continued)

*Primary Examiner* — Brent W Herring
(74) *Attorney, Agent, or Firm* — Barnes & Thornburg LLP

(57) ABSTRACT

The boat bunk includes an elongate beam, generally rectangular in cross-section, which beam includes a rigid inner core (1) and a resiliently deformable outer layer or shell (2) covering the core (1). The upper side of the outer layer or shell (2) defines the working surface. The working surface is provided with dome shaped raised protrusions (2a). The inner core (1) is made of unplasticized polyvinyl chloride (UPVC) or hardwood. The inner core (1) is reinforced with metal rods, strips or angled iron strips (7). The outer layer (2) is molded onto the inner core (1). The boat bunk includes fastening means for fastening the boat bunk to a trailer.

8 Claims, 4 Drawing Sheets

(56) References Cited

U.S. PATENT DOCUMENTS

| | | | | |
|---|---|---|---|---|
| 7,413,209 B2 * | 8/2008 | MacKarvich | ......... | B60P 3/1066 280/414.1 |
| 7,584,981 B2 * | 9/2009 | Vonderahe | ............. | F16F 1/373 280/414.1 |
| 7,753,389 B1 * | 7/2010 | Koball | ................. | B60P 3/1033 280/414.1 |
| 8,256,789 B2 * | 9/2012 | Bryant, II | ............. | B60P 3/1066 280/414.1 |
| 2003/0042704 A1 * | 3/2003 | Higginson | ............ | B60P 3/1066 280/414.1 |
| 2004/0069203 A1 * | 4/2004 | Fleming | ................. | B63B 59/02 114/345 |
| 2004/0091714 A1 * | 5/2004 | Gunn | ...................... | B32B 27/00 428/421 |
| 2004/0126185 A1 * | 7/2004 | Davidson | ................. | B63C 3/06 405/7 |
| 2005/0191474 A1 * | 9/2005 | Gunn | ...................... | B32B 27/08 428/212 |
| 2007/0170692 A1 * | 7/2007 | MacKarvich | ......... | B60P 3/1066 280/414.1 |
| 2009/0302572 A1 * | 12/2009 | Bryant, II | ............. | B60P 3/1075 280/414.1 |
| 2010/0189502 A1 * | 7/2010 | Basta | ........................ | B63C 3/06 405/3 |
| 2010/0283224 A1 * | 11/2010 | Allen | ...................... | B60P 3/1075 280/414.1 |
| 2011/0120039 A1 * | 5/2011 | Minelli | ................ | B29C 44/0461 52/309.7 |
| 2012/0076977 A1 * | 3/2012 | Schulner | .................. | E04B 1/26 428/119 |
| 2015/0158566 A1 * | 6/2015 | Doig | ........................ | B63C 3/06 405/7 |

* cited by examiner

BOAT BUNK

CROSS-REFERENCE TO RELATED APPLICATIONS

This application is a national stage entry under 35 U.S.C. §371(b) of PCT International Application No. PCT/ZA2013/000062, filed Aug. 6, 2013, and claims the benefit of South African Patent Application No. 2012/08706, filed on Nov. 20, 2012, both of which are expressly incorporated by reference herein.

TECHNICAL FIELD OF THE INVENTION

This invention relates to a boat bunk.

BACKGROUND TO THE INVENTION

The inventor is aware that boat bunks or boat landings whereon boats rest on a trailer is constructed from wood covered by a carpet or felt. The inventor identified a number of problems with the known boat bunks typically resulting from the wood rotting underneath the carpet or felt. A rotten boat bunk may break when the boat lands on the bunks when the boat is retrieved from the water onto the trailer or transported on the trailer causing damage to the boat. The carpet or felt may also separate from the wood, which can cause damage to the boat. The carpet or felt also collects dirt, grit and sand which is abrasive and damages the boat's hull.

It is an object of the invention to provide an improved boat bunk, which provides a low friction surface to allow the boat to slide thereon.

GENERAL DESCRIPTION OF THE INVENTION

According to the invention there is provided a boat bunk, which includes an elongate beam of polymeric material, generally rectangular in cross-section, which beam includes a rigid inner core and a resiliently deformable outer layer or shell covering the core of which the upper surface defines a working surface.

Although the above invention is functional if storage is for short periods, the applicant found that in some cases, especially if a boat is stored on the bunks for an extended period, that the boat is not easily released from the bunks.

The working surface may preferably be provided with raised protrusions or dimples. The raised protrusions or dimples should preferably dome shaped. The resiliently deformable raised protrusions prevent a suction fit to the hull of a boat, in use, while still preventing friction damage to the hull of the boat.

The inner core may be of unplasticized polyvinyl chloride (UPVC) or a hardwood. The inner core may be reinforced with metal rods, strips or angled iron strips.

The outer layer or shell may be moulded onto the inner core. The outer layer may be of poly urethane of suitable selected shore hardness to accommodate a specific boat weight or hull material.

The boat bunk may include a fastening means for fastening the boat bunk to a trailer. The fastening means may typically be bolts or screws to bolt or screw the boat bunk onto the mounting pad of a trailer. In the case of bolts, the beam may be provided with a recess into the working surface up to or into the inner core to countersink the bolts and to provide holding material for the bolts. A mounting plate provided with holes for receiving the bolts there through may be provided which fits into the recess. Alternatively, if the core is of a suitable material, the boat bunk may be screwed onto the mounting.

The invention also extends to a boat trailer fitted with a set of boat bunks as described above.

DETAILED DESCRIPTION OF THE INVENTION

The invention is now described by way of example with reference to the accompanying drawings.

Figure 1:
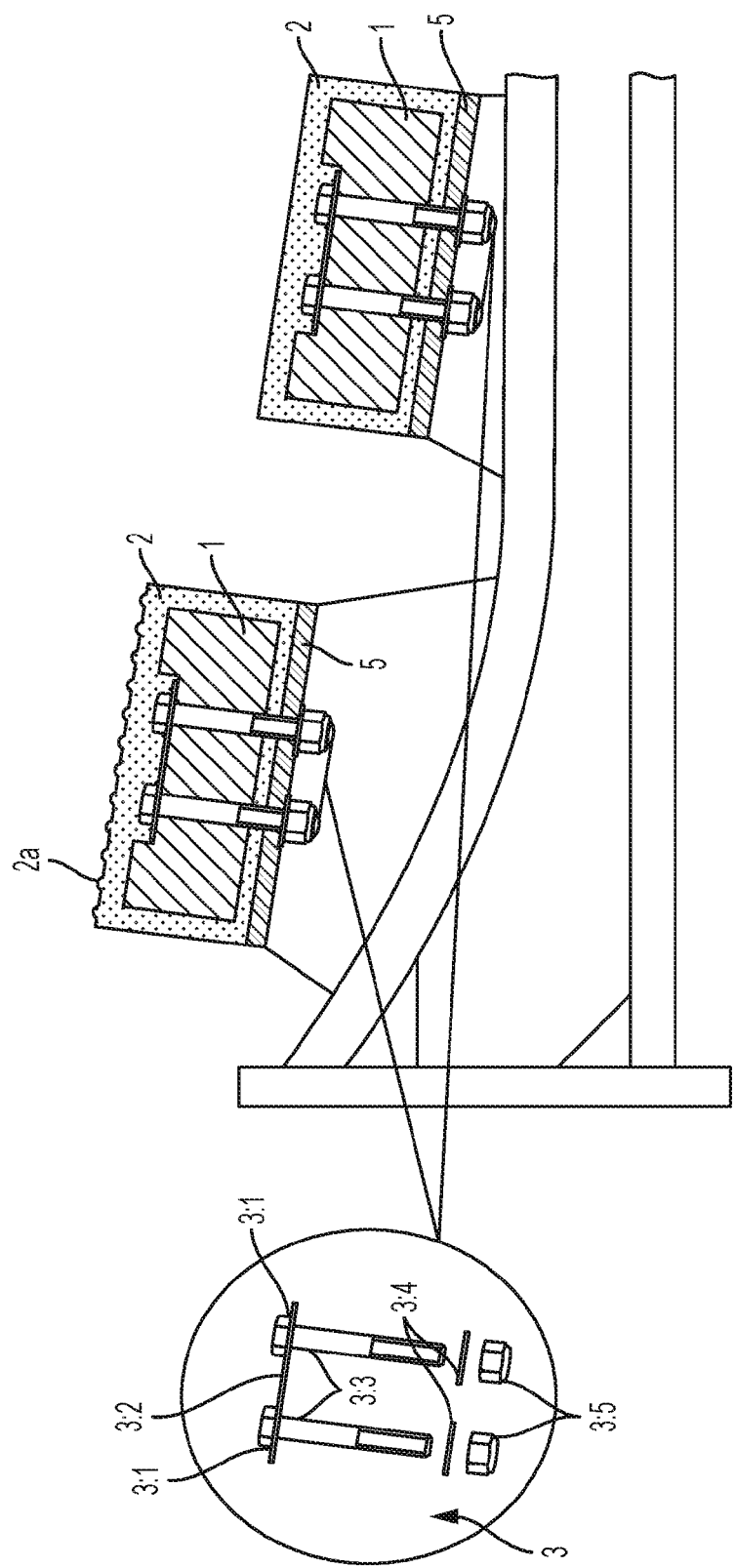
FIG. 1 shows a cross sectional end view of part of a boat trailer fitted with a boat bunk, in accordance with the invention.

Referring now to FIG. 1, the boat bunk, in accordance with the invention, includes a composite elongate beam of polymeric material rectangular in cross-section. The beam includes a rigid inner core 1 of UPVC and a resiliently deformable outer poly urethane layer or shell 2 moulded onto and covering the core to provide a low friction working surface. One of the bunks is provided with raised protrusions or dimples 2*a*.

The boat bunk then includes a fastening means 3 for fastening the boat bunk to a trailer. The fastening means includes stainless steel bolts 3.3 to bolt the boat bunk onto the mounting pad 5 of a trailer. The beam is provided with a recess into the working surface into the inner core to countersink the bolts 3.3 and to provide holding material for the bolts. A mounting plate 3.2 is provided with holes for receiving the bolts there through which plate fits into the recess. Bolt heads 3.3 are welded at 3.1 to the mounting plate to prevent it from turning while fastening lock nuts 3.5. Washers 3.4 and locknuts 3.5 are used.

Figure 2:
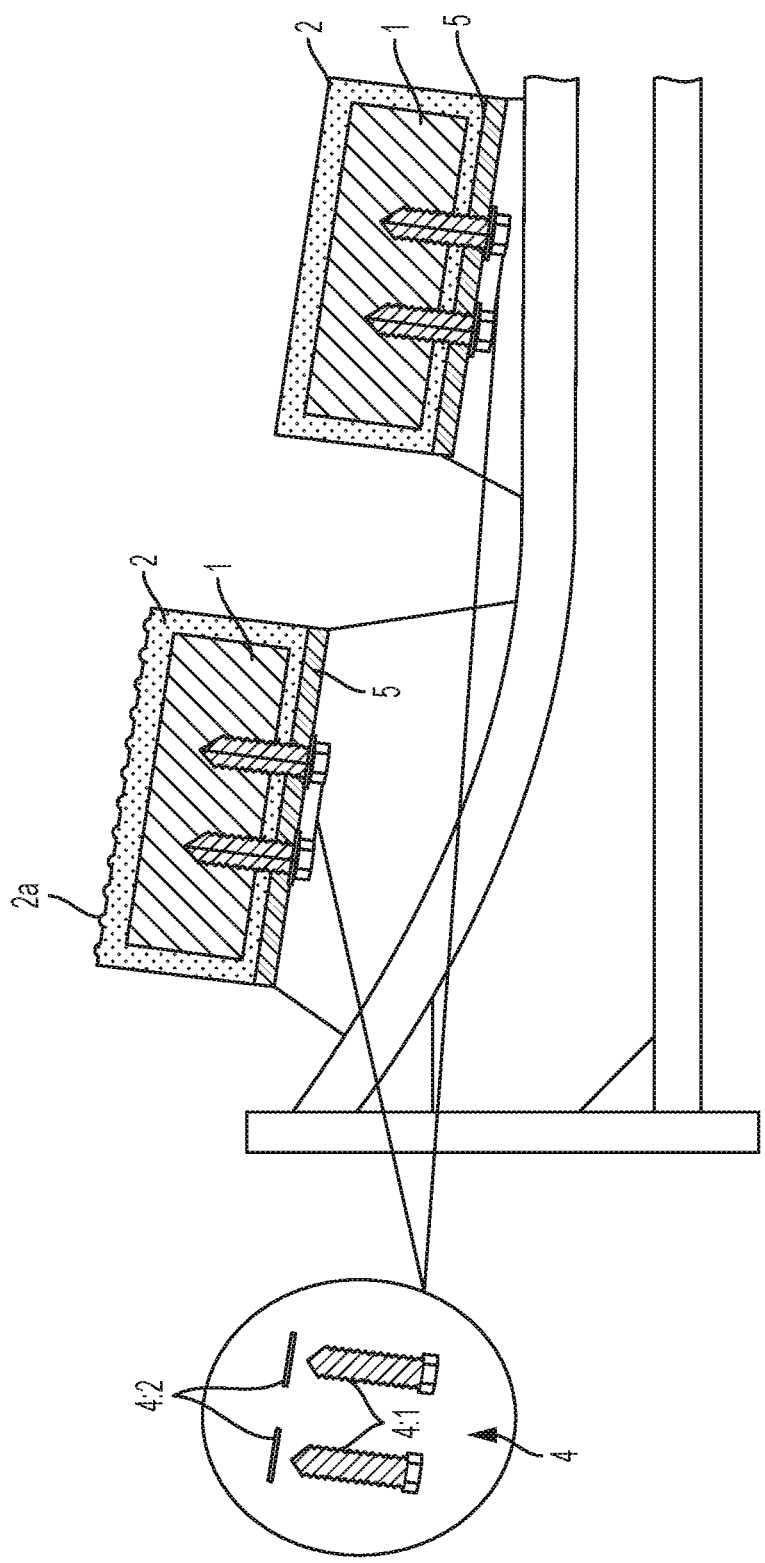
FIG. 2 shows a cross sectional end view of part of a boat trailer fitted with another embodiment of a boat bunk, in accordance with the invention.

Referring now to FIG. 2, the boat bunk, in accordance with the invention, includes a composite elongate beam of polymeric material rectangular in cross-section. One of the bunks is provided with raised protrusions or dimples 2*a*. The beam includes a rigid inner core 1 of teak wood and a resiliently deformable outer poly urethane layer or shell 2 moulded onto and covering the core to provide a low friction working surface. The boat bunk then includes a fastening means 4 for fastening the boat bunk to a trailer. The fastening means are self-tapping stainless steel screws 4.1 provided with washers 4.2 to screw the boat bunk onto the mounting pad 5 of a trailer from below the mounting pad not protruding through the core and there is no need to provide a recess to countersink the screws. This mounting method does not require precision drilled holes.

Figure 3:
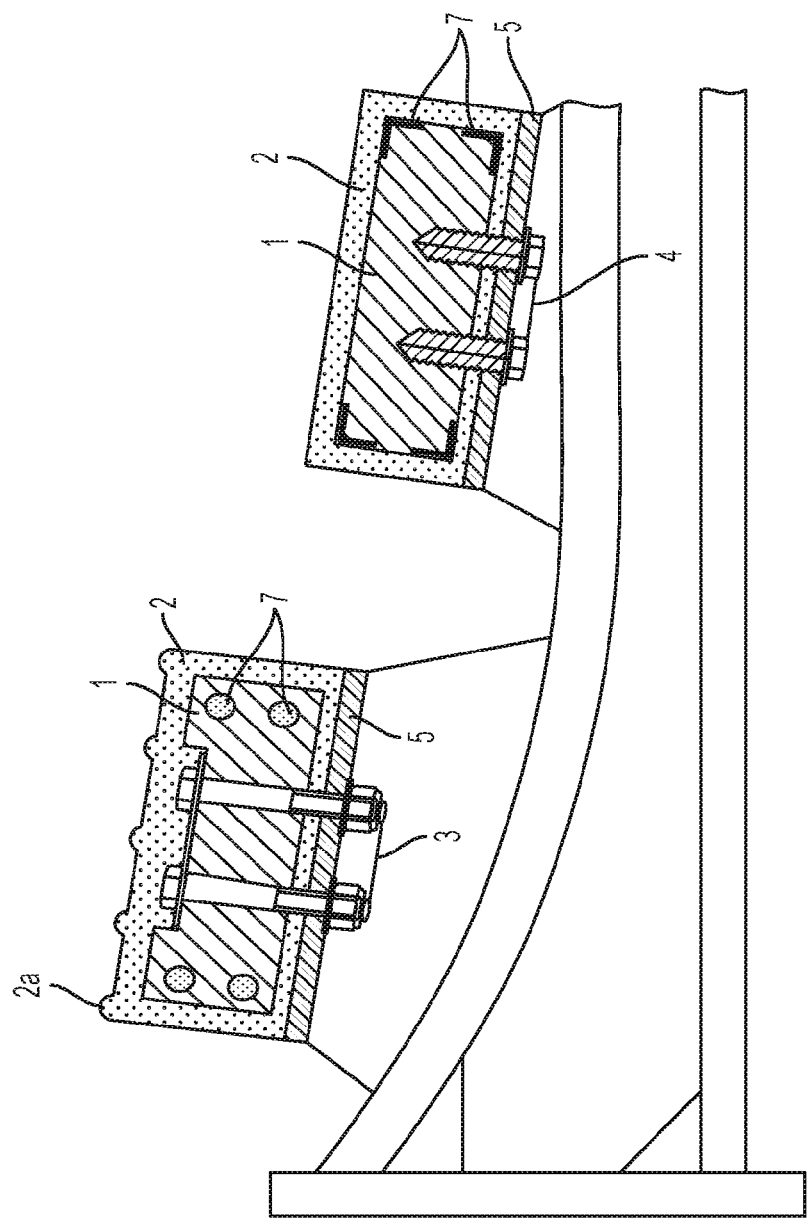
FIG. 3 shows a cross sectional end view of part of a boat trailer fitted with a further embodiment of a boat bunk, in accordance with the invention.
Figure 4:
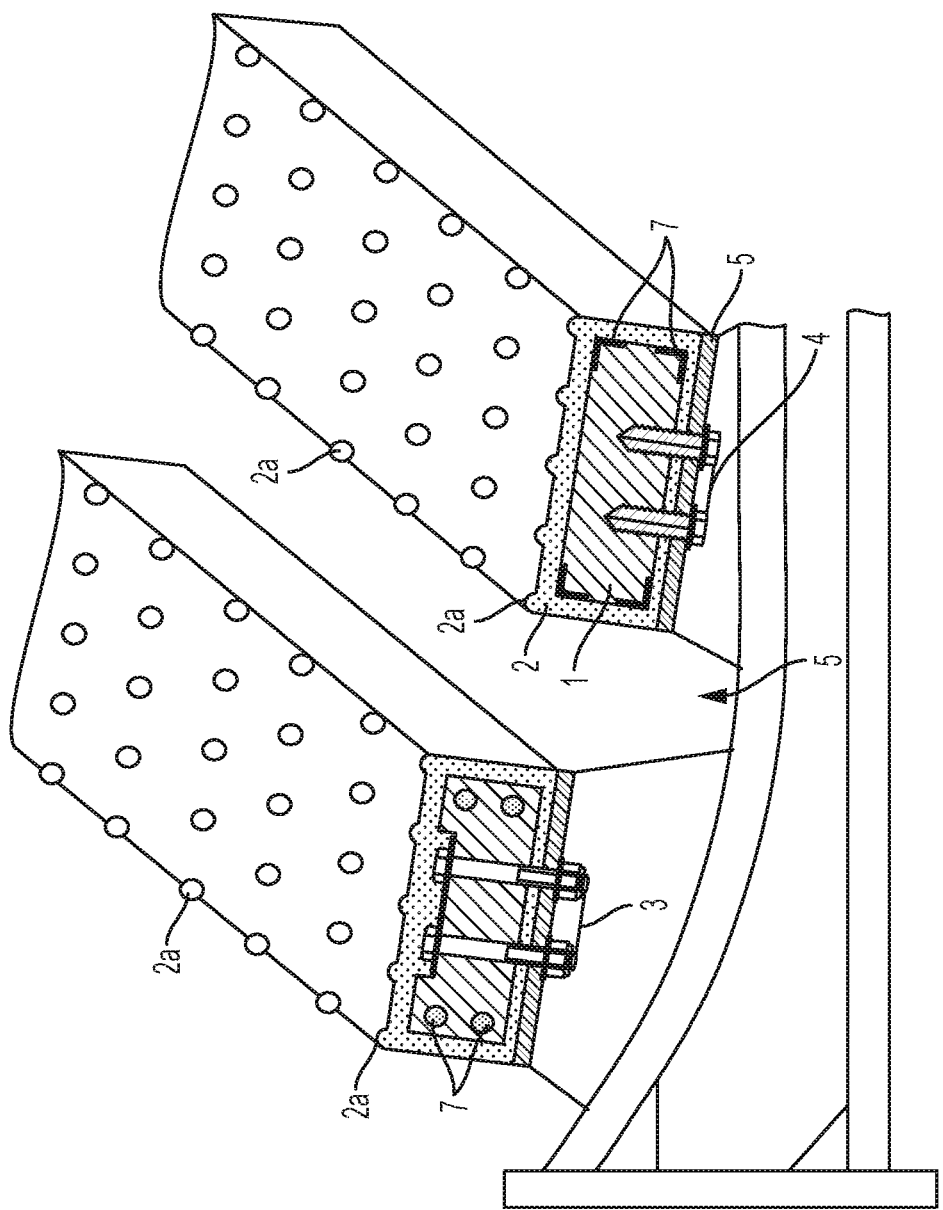
FIG. 4 shows a three dimensional view of a combination of embodiment to illustrate the invention further.

Referring now to FIG. 3, which shows two different boat bunks as described above of which the inner core is of UPVC and respectively reinforced with metal rods 7 and angled iron strips 7, in accordance with the invention. One of the bunks is provided with raised protrusions or dimples 2*a*.

It shall be understood that the examples are provided for illustrating the invention further and to assist a person skilled in the art with understanding the invention and are not meant to be construed as unduly limiting the reasonable scope of the invention.

The invention claimed is:

1. A boat bunk comprising an elongate beam generally rectangular in cross-section, which beam comprises a resiliently deformable polymeric outer layer covering a rigid inner core, wherein an upper surface of the beam defines a working surface provided with dome shaped raised protrusions, and wherein the inner core is unplasticized polyvinyl chloride (UPVC) and the outer layer is polyurethane.

2. The boat bunk of claim 1, wherein the inner core is reinforced with one or more of metal rods, strips, and angled iron strips.

3. The boat bunk of claim 1, wherein the outer layer is moulded onto the inner core.

4. The boat bunk of claim 1, further comprising a fastening means for fastening the boat bunk to a trailer.

5. A boat trailer fitted with a set of boat bunks, each of the boat bunks comprising an elongate beam generally rectangular in cross-section, which beam comprises a resiliently deformable polymeric outer layer covering a rigid inner core, wherein an upper surface of the beam defines a working surface provided with dome shaped raised protrusions, and wherein the inner core of each boat bunk is unplasticized polyvinyl chloride (UPVC) and the outer layer of each boat bunk is polyurethane.

6. The trailer of claim 5, wherein the inner core of each boat bunk is reinforced with one or more of metal rods, strips, and angled iron strips.

7. The trailer of claim 5, wherein the outer layer of each boat bunk is moulded onto the inner core.

8. The trailer of claim 5, further comprising fastening means for fastening each of the boat bunks to a frame of the trailer.

* * * * *